March 24, 1959     C. A. THOMAS     2,878,819

MILK PIPE LINE WASHING SYSTEM

Filed June 10, 1954     2 Sheets-Sheet 1

Inventor
Chester A. Thomas
By Schroeder, Hofgren,
Brady & Wegner
Attorneys

March 24, 1959 C. A. THOMAS 2,878,819
MILK PIPE LINE WASHING SYSTEM
Filed June 10, 1954 2 Sheets-Sheet 2
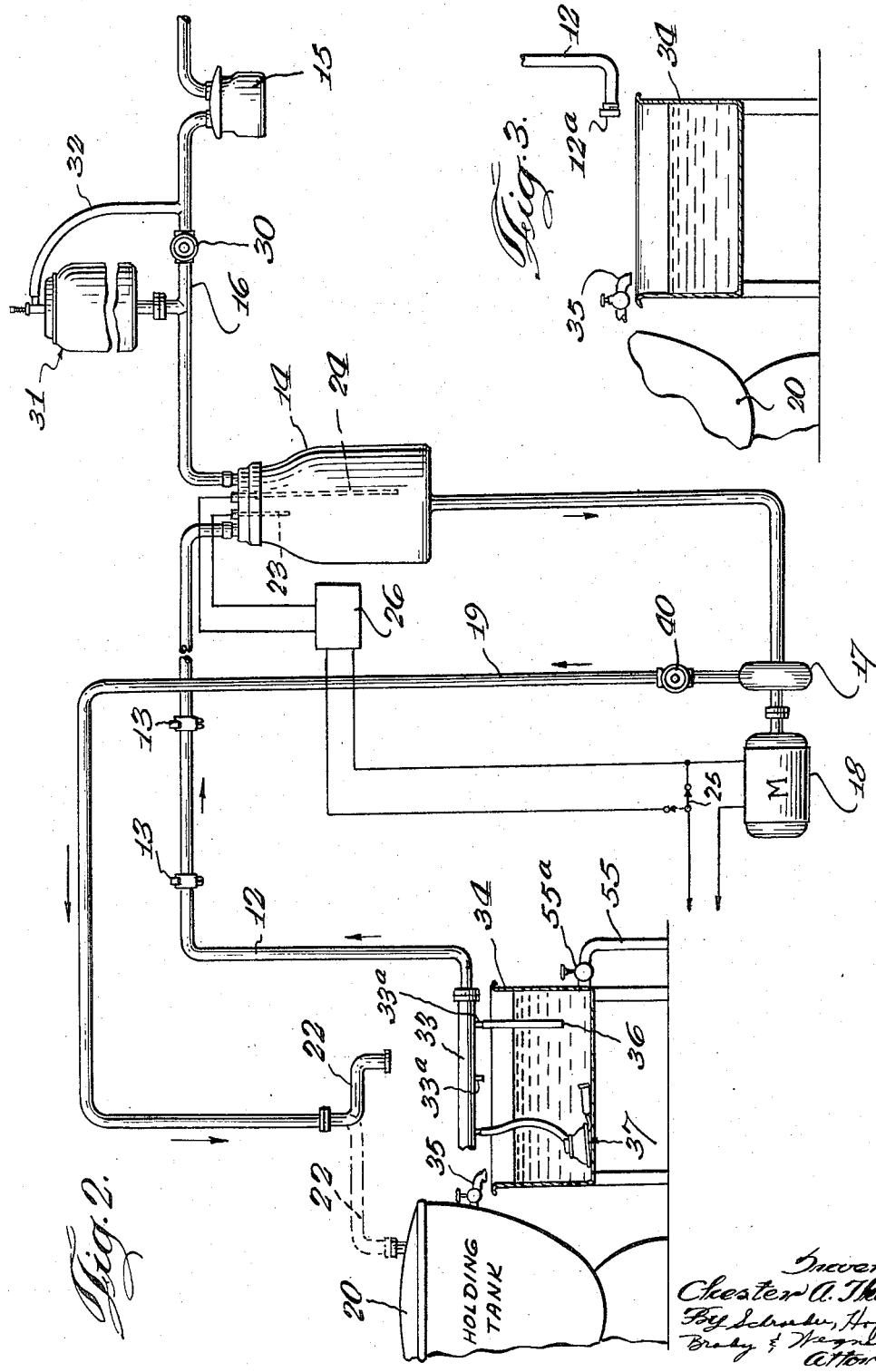

United States Patent Office 2,878,819
Patented Mar. 24, 1959

2,878,819

MILK PIPE LINE WASHING SYSTEM

Chester Arthur Thomas, Lake Forest, Ill., assignor to Babson Bros. Co., a corporation of Illinois Application June 10, 1954, Serial No. 435,812

9 Claims. (Cl. 134—57)

This invention relates to a washing system and more particularly to a washing arrangement for a carry-away milking system.

Milking systems for dairy farms are continually being refined and improved in an attempt to reduce the work of the dairy farmer to a minimum. One example of such an improvement is found in the so-called "carry-away" milking system which has been widely accepted by farmers. A carry-away system may take many different forms, being to a certain extent dependent on the type of structure in which it is installed. In a conventional stanchion barn, the carry-away milk line may be run around the periphery of the barn along the tops of the stanchions.

In a milking parlor employing parlor stalls of the type shown in Babson et al. Reissue Patent Re. 22,657, dated August 7, 1945, the carry-away milk line may be run along the side of the stalls.

Most such systems employ a source of vacuum connected to the carry-away pipe line and serving to draw the milk therethrough. At the delivery end of the pipe line suitable means are provided for removing the milk from the evacuated system, these means often taking the form of the chamber and pump arrangement disclosed more fully in copending Babson application, Serial No. 229,185 (assigned to the assignee of this application and now abandoned), filed May 31, 1951, in which a pump operates intermittently both to remove the milk from the evacuated system and to move it on through suitable conduits to further milk handling equipment, such as a holding tank, coolers or the like.

One of the problems that has been encountered with carry-away milking equipment is that of properly cleaning and sanitizing the entire system after the milking operation is completed. The carry-away pipe line sometimes is assembled from relatively short sections, such as 10 feet long, which may be disassembled and the individual sections scrubbed. This washing procedure, however, necessitates the complete disassembly of all the elements of the system and is a rather time-consuming job. There are arrangements available in which portions of the milking system may automatically be flushed with a washing solution, but in all such systems a large portion of the system must be disassembled and washed by hand.

It is a principal feature of this invention that it provides an improved washing arrangement with which all, or at least the major portion, of a carry-away milking system may be washed in place and which requires a minimum of special equipment and manual labor.

A feature of this invention is that it provides a washing arrangement for a carry-away milking system, comprising carry-away milking apparatus including a milk pipe line, means for causing circulation of a washing solution through the milk contacted portions of the apparatus in only a single direction and means for maintaining the milk contacted portions of the apparatus full of washing solution at all times. Another feature is that the means for causing circulation of the washing solution include both a pump and a source of vacuum. A further feature is that means are provided for controlling the operation of both the pump and the source of vacuum independently, for maintaining the milk contacted portions of the apparatus full of washing solution at all times.

Yet another feature is that the washing arrangement comprises carry-away milking apparatus including a milk pipe line, a reservoir for washing solution operably connectable to the milking apparatus, a source of vacuum connected to the milking apparatus for drawing the washing solution from the reservoir and through the pipe line, a pump connected to the milking apparatus for returning the solution to the reservoir, the vacuum source drawing solution into the apparatus faster than the pump returns it to the reservoir, and means for interrupting the vacuum applied to the apparatus, preventing flooding of the vacuum source.

Still a further feature of the invention is the provision of a washing control arrangement for controlling the circulation of a washing solution through a carry-away milking system including a carry-away milk pipe line having a source of vacuum operably connected thereto, comprising means for breaking the connection between the source of vacuum and the pipe line, means providing a by-pass around the broken connection and means for valving the by-pass to prevent entry of the washing solution into the vacuum source while maintaining the milk contacted portions of the system full of washing solution at all times.

Another feature is the provision of a manifold adapted to be secured to the end of the pipe line and adjacent the washing solution reservoir and having a plurality of openings therein adapted for the connection thereto of milk withdrawing apparatus immersed in the reservoir for simultaneously washing both the pipe line and the milk withdrawing apparatus. A further feature is the provision in the outlet connection of the pump of a swing joint readily detachably connected to further milk handling apparatus, the joint being disconnected from such apparatus during washing and a reservoir adjacent to the joint and adapted to have the joint positioned thereover during washing for discharging washing solution from the pump into the reservoir.

Further features and advantages will readily be apparent from the following specification and from the drawings, in which:

Figure 3 is a detailed view of the reservoir; and

Figure 4 is a vertical section of the vacuum control device.

Figure 1:
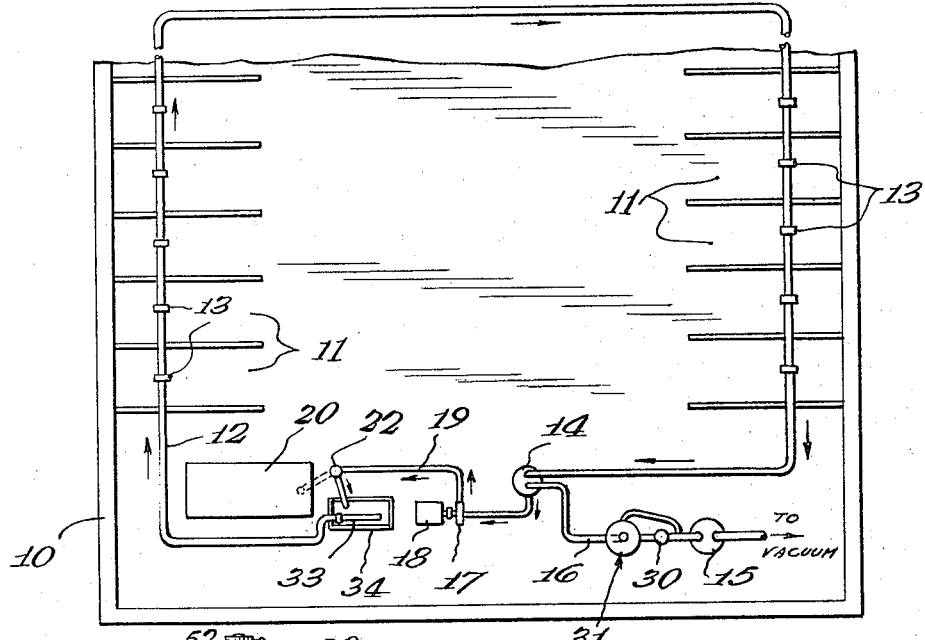
Figure 1 is a diagrammatic plan view of a milking barn employing a carry-away milk pipe line system and a washing arrangement illustrating my invention.

The embodiment of the invention illustrated in the drawings and hereinafter described in detail is particularly adapted for use with a carry-away system employing a pump for removing the milk from the evacuated system and sending it on through further milk handling apparatus. It will readily be apparent to those skilled in the art that many features of the invention may advantageously be utilized with other carry-away systems.

Referring now to the drawings, reference numeral 10 indicates a milking barn having a plurality of stalls 11 suitably arranged therein. A carry-away milk pipe line 12 extends generally around the periphery of the barn and is preferably carried along the tops of the stalls. Individual stall cocks 13 are provided in the pipe line, there being one for each stall; the stall cocks 13 may be of the type disclosed in Thomas application, Serial No. 319,812, filed November 12, 1952, now Patent No. 2,783,771, and are adapted to have the milk conduits of suitable milk withdrawing apparatus secured thereto for delivering milk to the pipe line.

During milking, one end of the pipe line 12 is capped as by a suitable cap member 12a (Figure 3) while the other end delivers milk to a container 14. A source of vacuum, such as a vacuum pump (not shown), is connected to container 14 through a suitable liquid trap 15 and a pipe 16, the vacuum aiding in the withdrawal of milk from the animals and causing it to flow through the pipe line 12 into container 14. The milk is removed from container 14 by suitable means such as rotary pump 17, driven by motor 18 and delivered through pump outlet pipe 19 to further milk handling apparatus such as holding tank 20. A swing joint 22 is provided in pump outlet pipe 19 and during milking is connected to holding tank 20, as shown in broken lines in Figures 1 and 2.

Figure 2:
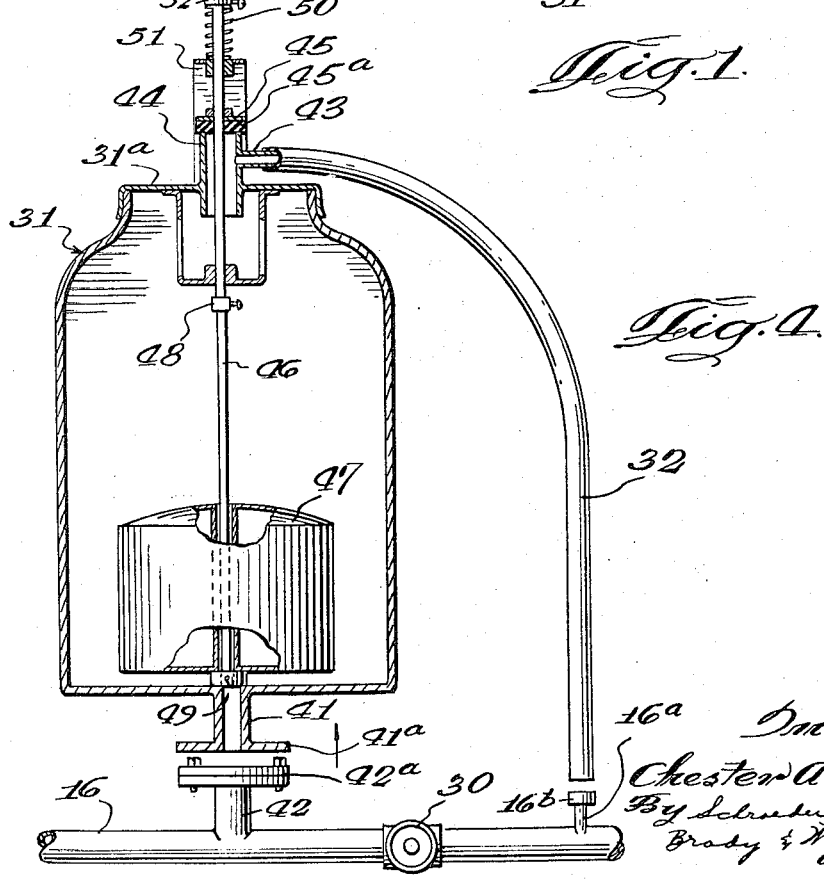
Figure 2 is a diagrammatic flow sheet illustrating the operation of the system.

With particular reference to Figure 2, during milking the operating of pump motor 18 is controlled by the level of milk in container 14 which has a pair of control electrodes 23 and 24 therein, one being positioned near the top of the container and the other extending to a point adjacent the bottom thereof. Switch 25 is placed in the broken line position connecting motor control unit 26 in the circuit. Motor control electrodes 23 and 24 are connected to the motor control unit 26 which operates in such a manner that motor 18 is energized when milk reaches electrode 23 causing milk to be pumped from the container and through pump outlet pipe 19 to holding tank 20. When the level of milk in container 14 drops below the lower end of electrode 24, control circuit 26 operates to remove motor 18 from the line stopping the pump.

The milk container is then allowed to refill from milk pipe line 12, the pump operating only intermittently but at a rate substantially greater than the rate of flow of milk through the pipe line. Further details of this pumping arrangement may be found in the aforementioned Babson application.

After the completion of the milking operation, a number of changes are made in the milking system to ready it for the washing operation. Shut-off valve 30 in vacuum line 16, which is open during milking, is closed breaking the connection between the source of vacuum and container 14. A valved by-pass arrangement including a chamber 31 and hose connection 32, the structure and operation of which will be described fully later, are provided to connect the source of vacuum to container 14 during washing. Cap 12a on the end of milk carry-away pipe line 12 is removed and replaced by a manifold 33 extending over a washing solution reservoir 34. In addition, swing joint 22 is disconnected from holding tank 20 and positioned over reservoir 34 to deliver the output of pump 17 thereto.

Reservoir 34 is filled with a suitable washing solution as water from tap 35 and connection is made between the pipe line 12 and the solution in reservoir 34, as by connecting rubber hose 36 to one of a plurality of nipples 33a provided on the manifold and suspending the hose in the washing solution. Rubber hose 36 may be one of the milk hoses associated with each of the milk withdrawing units or may be a special hose provided for this purpose. If desired, the entire milk withdrawing apparatus 37 may be immersed in the washing solution.

Switch 25 is moved to the solid line position shown in Figure 2 to connect motor 18 for continuous operation. Pump 17 is controlled by means of a throttle valve 40 connected in the output line 19 thereof to reduce the output of the pump to a rate lower than the rate at which washing solution is drawn through milk pipe line 12 by the operation of the vacuum.

Obviously, after the washing arrangement has been in operation for a short time, container 14 will be filled wish washing solution (as the container is filling more rapidly due to the vacuum than pump 17 is emptying it) and the washing solution will enter vacuum line 16. The function of the vacuum cutoff valve by-pass arrangement, including chamber 31 and hose 32, is to interrupt the application of vacuum to the system automatically preventing washing solution from entering the vacuum source, while at the same time maintaining the milk contacted portions of the system, milk pipe line 12, container 14, pump 17, pipe line 19 and swing joint 22 full of washing solution at all times.

Referring to Figure 4, it is seen that chamber 31 is provided with a depending pipe section 41 having a flanged end 41a adapted to be readily removably connected (as by bolts) to a similarly flanged pipe section 42 extending upwardly from vacuum pipe 16. During milking, chamber 31 is removed and pipe section 42 sealed by a cap member 42a. A valve might be placed in pipe section 42 and closed during milking to remove chamber 31 from the system.

Vacuum hose 32 is connected to a suitable nipple 16a on pipe line 16 and to a similar nipple 43 provided in cover member 31a of chamber 31. Nipple 16a is closed during milking by a cap member 16b. Chamber 31 and hose connection 32 constitute a by-pass for shut-off valve 30, which is closed during washing, and allow the vacuum to pull washing solution from reservoir 34 through pipe line 12 and into container 14.

As pointed out previously, the washing solution is drawn into container 14 faster than it can be removed by pump 17, the output capacity of which is throttled down by valve 40, and as a result the washing solution will completely fill container 14 and enter vacuum pipe 16 and chamber 31.

Cover member 31a of chamber 31 is provided with an upstanding pipe section 44 having an open upper end normally closed by valve member 45 which includes a resilient sealing member 45a. Valve member 45 has secured thereto a valve actuating arm 46 which extends generally vertically downwardly into chamber 31 and has a float member 47 slidably disposed thereon between a pair of adjustable collars 48 and 49. Valve 45 and the actuating arm assembly 46 are biased upwardly, toward the open position of the valve, by spring 50 seated on a frame 51 extending above the valve. Collar 52 may be moved to adjust the pressure of spring 50.

Before any liquid has entered chamber 31, the weight of float member 47 on collar 49 is sufficient to overcome the bias of spring 50, closing valve 45 and permitting vacuum to operate on the system as hereinbefore described. After the washing solution has filled container 14, it will enter pipe 16 and flow up into chamber 31. As chamber 31 fills, float 47 will rise along with the washing solution but valve 45 will be maintained in the closed position by virtue of the effect of the vacuum within chamber 31 thereon. As float member 47 rises it will contact collar 48 and eventually force valve 45 open against the action of the vacuum.

The opening of valve 45 vents the source of vacuum to atmosphere and removes or substantially reduces the vacuum applied to the system. This permits pump 17 to withdraw the washing solution from container 14 faster than it is being drawn in through pipe line 12 and the washing solution in chamber 31 flows back through vacuum line 16 into the container. When chamber 31 is substantially emptied, float member 47 contacts collar 49 and the weight thereof causes valve 45 to close, again applying the full vacuum to the system. Thus, it is seen that container 14 and pipe line 12 are maintained substantially full of the washing solution at all times, thoroughly washing the milk contacted portions of the entire system.

Preferably, throttle valve 40 in the outlet of pump 17 is adjusted so that chamber 31 fills very slowly and valve 45 is opened only occasionally, as once or twice, during a ten minute period.

In a normal washing operation the milking system would first be flushed with cold water and then washed with a hot detergent solution before being sterilized with a suitable bactericidal solution. Reservoir 34 is provided with a drain 55 having a valve 55a therein to facilitate changing of the solution being circulated.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. An arrangement of the character described for circulating washing solution through a carry-away milking system, including a carry-away milk pipeline, comprising: a pump operably connected to said system for circulating washing solution through a portion thereof; a source of vacuum operably connected to said milking system at a point spaced from the connection of said pump, for circulating washing solution through another portion thereof; and means operably connected with the system for controlling the rate of operation of at least one of said pumps and source of vacuum in response to the amount of the washing solution in the evacuated portion of the system for maintaining at least the milk contacted portions of said system full of washing solution at all times.

2. An arrangement of the character described for circulating washing solution through a carry-away milking system, including a carry-away milk pipeline, comprising: a pump operably connected to said system for circulating washing solution through a portion thereof; a source of vacuum operably connected to said milking system at a point spaced from the connection of said pump for circulating washing solution through another portion thereof; and means operably connected with the system, controlling the rate of operation of both said pumps and said source of vacuum for maintaining said milking system full of washing solution at all times the rate of operation of said source of vacuum being controlled in response to the amount of the washing solution in the evacuated portion of the system.

3. An arrangement of the character described in claim 2, wherein the means for controlling the vacuum comprise means for temporarily interrupting the application of the vacuum to the milking apparatus.

4. An arrangement of the character described for circulating washing solution through a carry-away milking system, including a carry-away milk pipeline, comprising: a reservoir for washing solution operably connected to said system; a source of vacuum; means operably connecting said source of vacuum to said system for drawing washing solution from the reservoir and through at least a portion of the milk pipeline; a pump operably connected to said milking system between the point of connection of said source of vacuum and said reservoir for returning said solution to the reservoir, said vacuum source drawing the solution into the pipleline faster than said pump returns it to the reservoir; and means operably connected with said source of vacuum for temporarily interrupting the vacuum applied to said system in response to the presence of washing solution in the means connecting the vacuum source to the system, preventing flooding of said vacuum source.

5. An arrangement of the character described for circulating washing solution through a carry-away milking system including a carry-away milk pipeline and means defining a milk receiving chamber, comprising: a reservoir for washing solution operably connected to said system; a source of vacuum; means operably connecting said source of vacuum to the top of said receiving chamber, the vacuum drawing washing solution from the reservoir through at least a portion of said milk pipeline and into said receiving chamber; a pump operably connected in said system between said receiving chamber and said reservoir for returning solution from the receiving chamber to the reservoir, said vacuum source drawing solution into said receiving chamber faster than said pump returns it to said reservoir; and means operably connected with said source of vacuum for temporarily interrupting the vacuum applied to said system in response to the presence of washing solution in the means connecting the vacuum source to the system, preventing flooding of said vacuum source.

6. An arrangement of the character described for circulating washing solution through a carry-away milking system including a carry-away milk pipeline and a milk receiving chamber, comprising: a reservoir for washing solution operably connected to said system; a source of vacuum; means operably connecting said source of vacuum to the top of said receiving chamber, the vacuum drawing the washing solution from the reservoir through at least a portion of said milk pipeline and into said receiving chamber; a pump operably connected in said milking system between an outlet of said receiving chamber and said reservoir for returning solution from the receiving chamber to the reservoir, said vacuum source drawing solution into said receiving chamber faster than said pump returns it to said reservoir; means defining a second chamber in the connection between the vacuum source and said receiving tank; a vent valve in said connecting means; and means responsive to the quantity of washing solution in said second chamber for opening said valve preventing flooding of said vacuum souce.

7. An arrangement of the character described in claim 6, wherein said valve is spring-biased toward the open position and has an actuating arm extending generally vertically into said chamber and said last mentioned means include lost motion means having a pair of spaced collars on said arm with a float member slidable thereon intermediate said collars and inside said chamber.

8. An arrangement of the character described for circulating washing solution through a carry-away milking system including a carry-away milk pipeline having a milk receiving tank connected thereto, comprising: a pump having an inlet connected to said tank and having an outlet connected to said pipeline; a source of vacuum connected to said tank; means operably connected with the pump controlling the rate of operation thereof; and means operably connected with the vacuum source controlling the application of vacuum to said apparatus in response to the amount of washing solution in the evacuated portion of the system, for maintaining the milk contacted portions thereof full of washing solution at all times.

9. An arrangement of the character described for circulating washing solution through a carry-away milking system including a carry-away milk pipeline having a milk receiving tank connected thereto, comprising: a pump having an inlet connected to the bottom of said tank and having an outlet connected to said pipeline; a source of vacuum connected to the top of said tank; a valve in the outlet of said pump and adjustable to control the output of said pump at a rate lower than the rate at which washing solution is drawn through the pipeline by said source of vacuum; and means operably connected with the vacuum source, automatically interrupting the application of vacuum to said system, preventing flooding of the source of vacuum while maintaining the milk contacted portions of the apparatus full of washing solution at all times.

References Cited in the file of this patent
UNITED STATES PATENTS

| | | |
|---|---|---|
| 1,328,657 | Fish | Jan. 20, 1920 |
| 1,645,356 | Shurts | Oct. 11, 1927 |
| 2,102,267 | Hodsdon | Dec. 14, 1937 |
| 2,603,227 | Paxton | July 15, 1952 |
| 2,624,355 | Buchinger | Jan. 6, 1953 |
| 2,680,445 | Hemminger | June 8, 1954 |
| 2,685,884 | Heckendorf | Aug. 10, 1954 |
| 2,730,992 | Kessler | Jan. 17, 1956 |
| 2,733,667 | Hill | Feb. 7, 1956 |